UNITED STATES PATENT OFFICE.

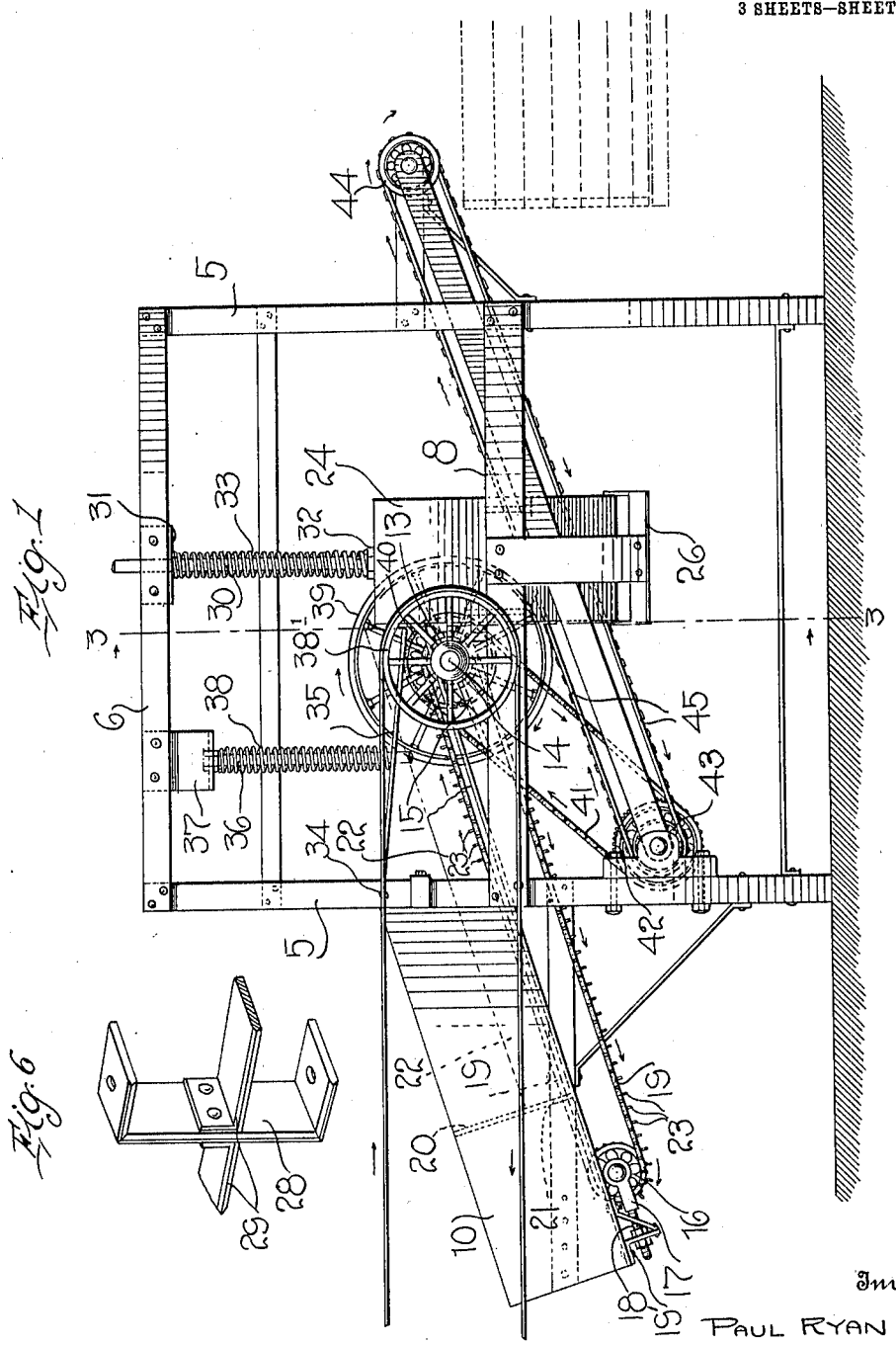

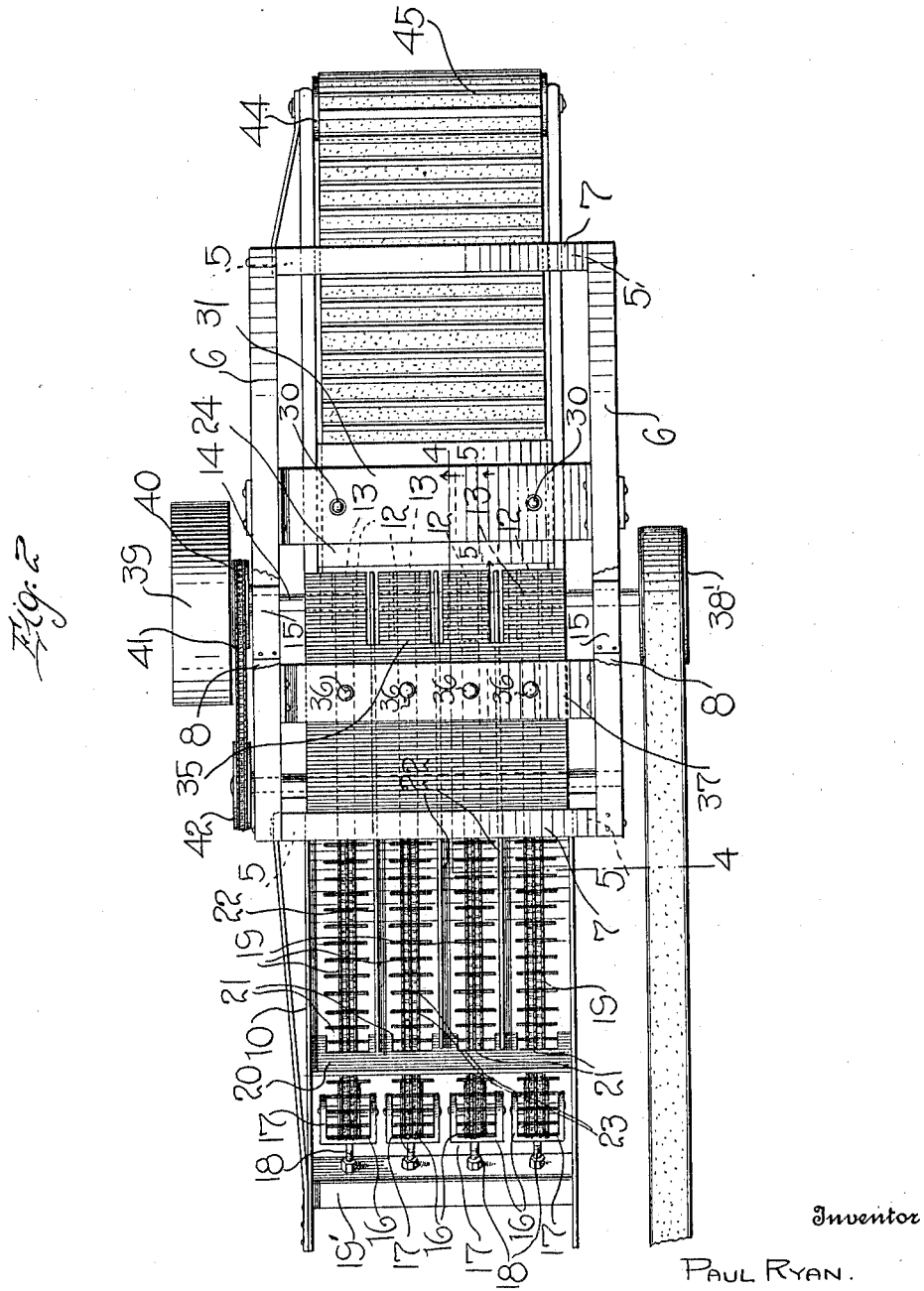

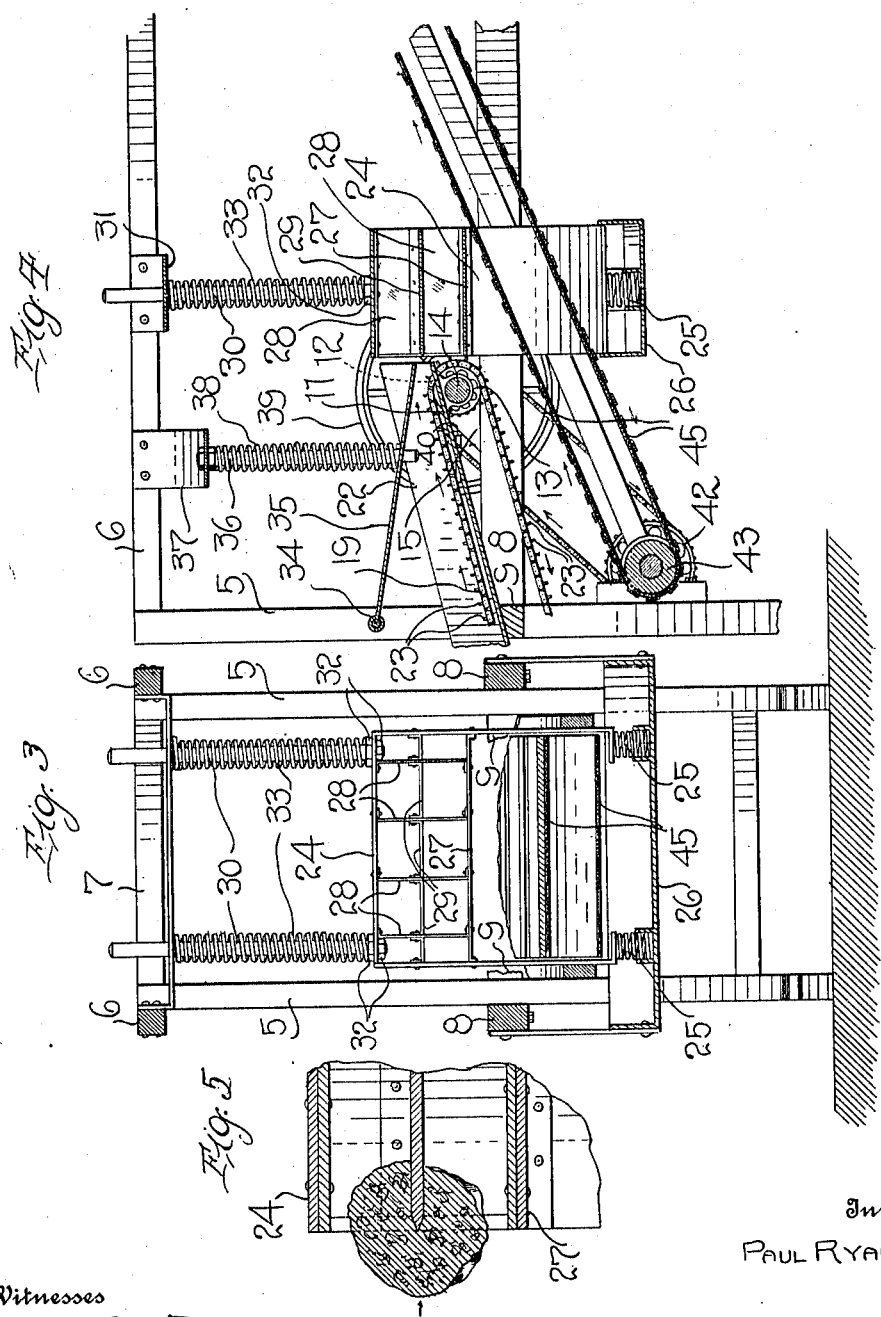

PAUL RYAN, OF MANILLA, IOWA.

VEGETABLE-CUTTING MACHINE.

1,099,205.  Specification of Letters Patent.  Patented June 9, 1914.

Application filed January 17, 1914. Serial No. 812,775.

*To all whom it may concern:*

Be it known that I, PAUL RYAN, a citizen of the United States, residing at Manilla, in the county of Crawford and State of Iowa, have invented certain new and useful Improvements in Vegetable-Cutting Machines, of which the following is a specification, reference being had to the accompanying drawings.

This invention relates to vegetable cutting machines and more particularly to a machine for cutting seed potatoes, the invention having for its primary object to provide means for expeditiously cutting a large number of potatoes into a multiplicity of small sections for planting purposes.

The invention has for another of its objects to provide a machine of the above character embodying yieldably mounted cutting knives, means for feeding the potatoes to said knives, and additional means yieldably engaging the potatoes to hold the same in position upon the feeding means for proper engagement with the knives.

The invention has for still another of its objects to provide a knife frame with a plurality of crossed or intersecting knives mounted therein, and means for removably mounting said frame in the main frame of the machine for yielding vertical movement with respect thereto.

The invention has for a still further object to produce a vegetable cutting machine which consists of comparatively few parts all of simple form, thereby conducing to a low cost of manufacture and obtaining a high degree of operating efficiency and durability in actual use.

With the above and other objects in view, the invention consists in the novel features of construction, combination and arrangement of parts as will be hereinafter referred to and more particularly pointed out in the specification and claims.

For a full understanding of the invention, reference is to be had to the following description and accompanying drawings, in which—

Figure 1 is a side elevation of a vegetable cutting machine embodying my invention in its preferred form. Fig. 2 is a top plan view thereof. Fig. 3 is a section taken on the line 3—3 of Fig. 1. Fig. 4 is a section taken on the line 4—4 of Fig. 2. Fig. 5 is a detail vertical section taken on the line 5—5 of Fig. 2. Fig. 6 is a detail perspective view of one of the cutting knives removed from the frame.

Referring in detail to the drawings, 5 designates the uprights of the main frame of the machine, connected at their upper ends by longitudinal and transverse bars 6 and 7 respectively, said uprights being also connected intermediate of their ends by the longitudinal bars 8 and adjacent their lower ends by means of the transverse bars 9.

A feed hopper, indicated at 10, is mounted upon the corresponding frame uprights 5 and is obliquely inclined upwardly toward its discharge end. The bottom of this hopper is extended inwardly from the frame uprights, as shown at 11, and this extension is provided in its end with the spaced longitudinal slots 12 to accommodate the sprocket wheels 13 fixed upon a transverse shaft 14 which is mounted in suitable bearings 15 upon the longitudinal frame bars 8. These sprocket wheels are traversed by the chains 19 which are adapted to pass over the upper surface of the bottom wall of the feed hopper 10 and around the sprocket wheels 16 which are mounted in yoke members 17. These yoke members are attached to the rods 18 which have threaded engagement in a transverse bar 19' mounted in the lower end of the hopper 10 and between said walls thereof. It will be readily understood that by simply adjusting these rods in the bar 19', the feed chains 19 may be easily and quickly removed or slack in the chains taken up. The end wall 20 of the hopper 10 is provided in its lower portion with slots 21 for the accommodation of said chains.

Upon the base wall of the hopper between the several feed chains 19, vertical partition walls 22 are secured. Thus separate compartments or runways are provided for the potatoes or other vegetables which are engaged by flights or cleats 23 secured upon the respective chains.

A metal frame 24 of substantially inverted U-shape form is mounted between the side bars 8 of the main frame. The vertical legs of this frame have their lower ends seated upon the springs 25 mounted in the housings 26 which are secured to the bars 8. The frame 24 also includes a plate 27 extending in parallel relation to the intermediate portion of the frame and the vertical division plates 28. Between these latter plates the cutting knives are arranged.

Various arrangements of the knife blades may be employed, but in the form illustrated in the drawings, I employ the intersecting blades 29 which are secured to each other and to the frame 24. It will be understood that the number of these intersecting sets of knife blades which are mounted in the frame 24 will be determined by the number of feed chains 13 which are employed, as said chains direct the potatoes against the blades at their intersecting points. Vertically disposed rods 30 are loosely mounted in a transverse bar 31 which is fixed at its ends to the upper longitudinal bar 6 of the main frame. The lower ends of these rods extend through openings provided in the intermediate portion of the frame 24 and have clamping nuts 32 threaded thereon, whereby said frame may be vertically adjusted upon the rods. Springs 33 are arranged upon said rods and bear at their lower ends upon the frame 24 and at their upper ends against the bar 31. These latter springs in addition to the lower springs 25 serve to yieldingly hold the knife frame against vertical movement with respect to the main frame of the machine.

A rod or bar 34 is loosely mounted at its ends in the corresponding frame uprights 5 and a plurality of spaced blades 35 are secured to, or formed upon, this rod. These blades project toward the cutting knives and through each of them the lower end of a rod 36 is loosely disposed. The upper ends of these rods are secured in a transverse bar 37 which is secured at its ends to the frame bars 6. Coil springs 38 are disposed upon the rods 36 and act to force the blades 35 downwardly upon the potatoes as they are directed by the moving chains 13 against the intersecting knife blades 29.

One end of the shaft 14 is provided with a band wheel 38' to receive a driving belt extending from an engine or other suitable source of power, and the opposite end of this shaft is provided with a fly wheel 39. This latter end of the shaft is further equipped with a sprocket wheel 40 which is connected by means of the chain 41 to a similar sprocket wheel 42 on the end of the shaft of a roller 43 which is suitably mounted in the main frame of the machine. A second roller 44 is also mounted in the main frame and upon these rollers the elevating belt 45 is arranged. This belt is disposed at an inclination as shown and is further provided with slats or cleats so that the cut vegetables will be caught thereby and discharged from the upper end of the elevator.

From the foregoing description in connection with the accompanying drawings, it is believed that the construction, manner of operation and the several advantages of the invention will be clearly and fully understood.

The potatoes or other vegetables are of course placed in the hopper 10, the same being caught by the cleats on the traveling chains 19 and carried upwardly thereby. The blades 35 are forced downwardly by the springs 38 upon the potatoes so that they are properly held upon said chains and directed against the intersecting cutting blades. These blades divide the potatoes into a plurality of small particles which are forced beyond or rearwardly of the blades and fall downwardly upon the upper stretch of the endless elevator 44, from the upper end of which they are finally discharged into a suitable receptacle.

It will be appreciated that a machine constructed in accordance with my invention as above described will be very efficient in its operation and capable of properly and quickly cutting a large number of potatoes or other vegetables for planting purposes.

The machine as a whole is very simple in its construction and may be manufactured at a relatively small cost. While I have shown and described the preferred construction and arrangement of the several elements employed, it will be understood that my invention is susceptible of considerable modification therein and I therefore reserve the privilege of resorting to all such legitimate changes as may be fairly embodied within the spirit and scope of the invention as claimed.

What I claim is:

1. In a machine of the character described, a main frame including a hopper mounted therein and provided upon its bottom wall with a plurality of longitudinal partition walls forming a series of compartments therein, feed chains movable over the bottom wall of the hopper in the several compartments thereof, a yieldably supported vertically movable frame mounted in the main frame at the upper ends of said feed chains, a plurality of intersecting cutting knives mounted in said latter frame, said chains directing the vegetables against the intersecting points of said knives, and means mounted above the upper ends of the chains and having bearing engagement with the vegetables to hold the same upon the chains as they are directed against the cutting knives.

2. In a machine of the character described, a frame, including a hopper provided with a plurality of longitudinal compartments therein mounted in said frame, endless feed chains movable through said compartments, a spring supported vertically movable frame mounted in the main frame of the machine, a series of intersecting cutting knives mounted in the latter frame, a transverse rod journaled at its ends in the main frame, a plurality of spaced blades secured upon said rod extending over the upper ends of the feed chains, springs bearing upon said blades and acting to force the same downwardly upon the potatoes carried by the respective chains to hold the same in position to be directed against the cutting knives at their intersecting points, means for operating the feed chains, and additional means for discharging the cut potatoes from the machine.

In testimony whereof I hereunto affix my signature in the presence of two witnesses.

PAUL RYAN.

Witnesses:
 F. L. VAN SLYKE,
 EDW. THEOBALD.

Copies of this patent may be obtained for five cents each, by addressing the "Commissioner of Patents, Washington, D. C."